J. ALSOP.

Grain-Drill.

No. 29,752.

Patented Aug. 28, 1860.

WITNESSES
J W Coombe
R S Spencer

INVENTOR:
James Alsop
per Munn & Co
attys

UNITED STATES PATENT OFFICE.

JAMES ALSOP, OF CLINTON, ILLINOIS.

IMPROVEMENT IN SEEDING-MACHINES.

Specification forming part of Letters Patent No. 29,752, dated August 28, 1860.

*To all whom it may concern:*

Be it known that I, JAMES ALSOP, of Clinton, in the county of De Witt and State of Illinois, have invented a new and Improved Seeding-Machine; and I do hereby declare that the following is a full, clear, and exact description of the same, reference being had to the annexed drawings, making a part of this specification, in which—

Figure 1:
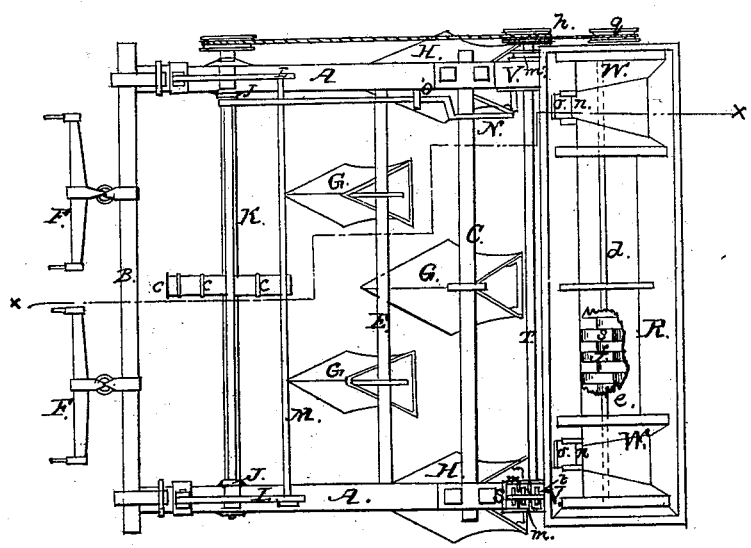
Figure 2:
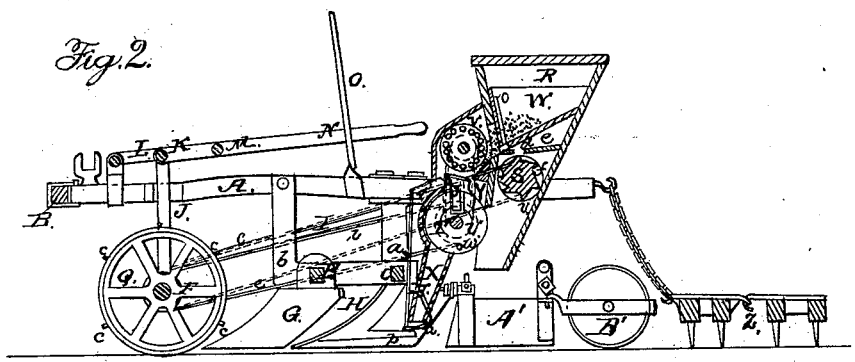

Figure 1 is a plan or top view of my invention; Fig. 2, a side sectional view of the same, taken in the line $x\,x$, Fig. 1.

Similar letters of reference indicate corresponding parts in the two figures.

This invention relates to certain improvements in that class of seeding-machines which are designed for general use—that is to say, for planting various kinds of seeds and either in hills or drills or broadcast, as may be required.

The invention consists in a novel seed-distributing arrangement, substantially as hereinafter fully shown and described.

To enable those skilled in the art to fully understand and construct my invention, I will proceed to describe it.

A A represent two beams, to the front ends of which a cross-bar, B, is attached. A cross-bar, C, is also attached to the standards $a$ of the plows D, and a cross-bar, E, is attached to right-angular arms or plates $b$, which are secured to the beams A. These bars form a direct connection between the two beams.

To the front bar, B, the whiffletrees F F are attached, and to the bars C E plows G may be attached in such a way as to admit of being readily removed when necessary. The beams A A are provided at their back parts with the usual double-mold-board plows, H H.

To the upper part of each standard $a$ there is attached a metal rod, I, the front ends of which are secured to vertical slides J, that are fitted on the beams A A. The upper ends of the slides J are attached to a shaft, K, on each end of which a lever, L, is fitted. The front ends of the levers L are attached to the beams A A and the back ends are connected by a rod, M.

N is a lever, the front end of which is fitted on the shaft K. The rod M passes through the lever N. This lever N extends back a certain distance and passes through a notched guide, $o$, attached to one of the beams A.

In the lower parts of the slides J J the journals of a shaft, P, are fitted, and on this shaft, at about its center, there is placed a wheel, Q, the periphery of which is provided with teeth or projecting ledges $c$ to prevent its slipping.

From the above description it will be seen that by actuating the lever N the plows may have their points more or less depressed, so as to have a greater or less tendency to enter the ground in order to vary the depth of the furrows, as may be required.

On the back parts of the beams A A there is placed a seed box or hopper, R, which has a longitudinal slot, $d$, in its bottom $e$, said slot extending the whole length of the hopper.

Directly below the bottom $e$ there is placed a cylinder, S, the periphery of which is provided with recesses or seed-cells $f$. To one end of the axis of the cylinder S, at the outer side of the hopper, there is attached a pulley, $g$, which is rotated by a belt, $h$, from a shaft, T, the latter shaft being rotated by a belt, $i$, from the shaft P.

At each end of the shaft T there is a wheel, U, which is provided at its periphery with seed-cells $j$. The wheels U are directly under the beams A A, and holes or openings $k$ are made in the latter, so that the cells $j$ in the wheels U may communicate with boxes V, which are directly in front of the hopper R or near each end of it.

In the boxes V there are placed wheels S' S', one in each. These wheels are perforated and provided with pins $l$, which project horizontally from both sides of them near their peripheries. Pins $m$ project also from the sides of the boxes V toward the wheels S' and within the path of the movement of the pins $l$. The wheels S' are rotated by belts $m'$ from the shaft T.

Within the hopper R, at each end, a seed-box, W, is placed, and these seed-boxes communicate with the boxes V by means of openings $u$ with slides $o$.

X represents a seed-conveying tube, one being placed below each wheel U and extending down within the plows H directly over horizontal bars $p$, which serve as scatterers. In the lower part of each tube X there is placed a valve, $q$, to each of which an arm, $r$, is attached. The outer ends of the arms $r$ are connected by light rods or wires $s$ with small levers $t$ at the inner sides of the beams, and the lower ends of the rods or wires $s$, below the arms $r$, are connected to springs $u$, which have a tendency to keep the valves $g$ closed.

To the inner side of each beam A there is attached by a pivot, $v$, a weighted arm, Y, and the front ends of these arms rest in the back ends of the levers $t$. To the inner side of each wheel U there is attached a pin, $w$.

If it is designed to sow broadcast, the slides $o$ are closed, and the boxes W may be removed, and the hopper R filled with the seed to be sown. As the machine is drawn along the cylinder S, as it rotates, sows the seed in a broadcast manner, the cells $f$ filling with the seed as they pass underneath the slot $d$ in the bottom $e$ of the hopper R.

In case it is required to plant the seeds in drills or hills, the boxes W are placed in the hopper R and filled with the seed to be planted, the slides $o$ are raised a requisite distance, and the seed passes through the openings $u$, and the wheels S', with the pins $l\ m$, detach the seed in case they adhere together, and cause the same to be presented to the wheels U, so as to insure them passing into their cells $j$, by which the seed is conveyed into the tubes X, the seed falling on the valves $q$, which retain it until the pins $w$ of the wheels U strike the arms Y, elevate their front ends, and cause them to fall on the back ends of the levers $t$, which, being thus acted upon, raise the valves $q$ and allow the seed to escape. Each dropping of the wheels U is thus retained and let fall from the lower ends of the tubes X, and all unnecessary scattering avoided. The valves $q$ are thrown back to their original position by the springs $u$.

To the back ends of the beams A a drag or harrow, Z, may be attached, when necessary, and to the back end of each plow H covering-shares A' and a roller, B', are attached.

Having thus described my invention, what I claim as new, and desire to secure by Letters Patent, is—

1. The arrangement of the wheels S' U with the tubes X and boxes V, provided with the valves $q$ and actuated through the medium of the arms $r$, levers $t$, weighted arm Y, and the pins $w$ on the wheels U, as and for the purpose set forth.

2. In combination with the wheels S' U and boxes V, the cylinder S and hopper R, when arranged, as shown, to admit of the sowing of the seed either in hills or drills or broadcast, as may be desired.

JAMES ALSOP.

Witnesses:
ROBERT LEWIS,
WM. H. HARRISON,
JOHN J. MCGRAW.